United States Patent [19]

Gurkovich et al.

[11] Patent Number: 5,623,724
[45] Date of Patent: Apr. 22, 1997

[54] HIGH POWER CAPACITOR

[75] Inventors: Stephen R. Gurkovich, Penn Hills; Kenneth C. Radford, North Huntingdon; Deborah P. Partlow, Export, all of Pa.

[73] Assignee: Northrop Grumman Corporation, Los Angeles, Calif.

[21] Appl. No.: 287,818

[22] Filed: Aug. 9, 1994

[51] Int. Cl.$^6$ ..................................... B22F 7/04
[52] U.S. Cl. ..................... 419/8; 419/10; 419/19; 419/23; 361/321.2; 361/321.3; 427/123
[58] Field of Search .................. 419/8, 10, 19, 419/23; 361/321.2, 321.3, 321.5, 322; 427/226, 372.2, 123, 125, 126.1; 423/339, 592; 501/134

[56] References Cited

U.S. PATENT DOCUMENTS

| | | | |
|---|---|---|---|
| 4,810,484 | 3/1989 | Uedaira et al. | 423/598 |
| 4,826,709 | 5/1989 | Ryan et al. | 427/240 |
| 4,835,656 | 5/1989 | Kitahara et al. . | |
| 5,028,455 | 7/1991 | Miller et al. | 427/126.3 |
| 5,064,783 | 11/1991 | Luckevich | 501/12 |
| 5,106,796 | 4/1992 | Drozdyk et al. | 501/137 |
| 5,140,498 | 8/1992 | Radford et al. . | |
| 5,146,299 | 9/1992 | Lampe et al. | 357/23.5 |
| 5,162,977 | 11/1992 | Paurus et al. | 361/401 |
| 5,182,695 | 1/1993 | Handa et al. | 361/321 |
| 5,192,871 | 3/1993 | Ramakrishnan et al. | 257/595 |
| 5,234,556 | 8/1993 | Oishi et al. . | |
| 5,268,006 | 12/1993 | Ueno et al. | 29/25.03 |
| 5,308,807 | 5/1994 | Moeggenborg et al. | 501/134 |
| 5,371,262 | 12/1994 | Arkles | 556/449 |

OTHER PUBLICATIONS

*Engineered Materials Handbook*, vol. 4: Ceramics and Glasses, ASM, USA, pp. 209–213; 445–451 (1991).

Primary Examiner—Charles T. Jordan
Assistant Examiner—Daniel Jenkins
Attorney, Agent, or Firm—Philip A. Florenzo

[57] ABSTRACT

A ceramic capacitor suitable for high energy density and high temperature application is disclosed. Such a capacitor is prepared by producing the selected ceramic powder via the sol-gel process forming the capacitor to the desired shape with the resulting powder using tape casting technology and firing the "green" form so produced.

14 Claims, 1 Drawing Sheet

HIGH POWER CAPACITOR

FIELD OF THE INVENTION

This invention relates to the fabrication of ceramic capacitors suitable for high energy density and high temperature application. More particularly, the present invention relates to a novel process for the fabrication of such ceramic capacitors utilizing sol-gel technology and tape casting and to the products obtained by the process.

BACKGROUND OF THE INVENTION

Present advanced and future power and electronic circuits require higher energy or power density, and/or higher temperature capacitors than those presently available. Applications include for example, inverter and pulse forming network circuits, electronic filters in mobile, or ground based as well as spaced based-systems. Polymer film dielectrics today provide the highest energy and power density capacitors available, in the range of 100–1000+ volts, although there are limitations. These capacitors contain windings of film and foil electrodes, and an impregnant for high voltage operation. This wound structure provides a more efficient capacitor in terms of weight and volume than stacked-layer capacitors. The use of ceramic materials for high energy and power density as well as high temperature operation is very attractive because ceramics can have both high dielectric constant (far higher than available polymeric films which display $\epsilon \sim 10$ or less) and also high temperature stability. Ceramics can have dielectric constants ($\epsilon$'s) ranging from the low single digits (e.g., $SiO_2=3.8$) to tens of thousands for complex multiphase materials. However, those having very high dielectric constant generally have significantly high dielectric losses (Tan $\delta$), which, for some applications is not allowable. The more common ceramic materials used in capacitor manufacture have values $\epsilon$ in the low hundreds, with reasonably low dielectric losses, and also reasonable high dielectric strength (voltage stand-off). The table below lists some typical capacitor ceramic materials.

TABLE I

Dielectric properties for typical candidate for high power capacitors.

| Ceramic | Dielectric constant $\epsilon$ | Dielectric loss Tan $\delta$ |
| --- | --- | --- |
| $SiO_2$ | 3.8 | 0.0003 |
| $Al_2O_3$ | 10 | 0.0001 |
| BaO | 34 | 0.001 |
| $TiO_2$ | 90 | 0.0005 |
| $PbTiO_3$ | 110 | 0.003 |
| $BaTiO_3$ | 2000–4500 | 0.003 |
| NPO * | 62 | <0.002 |
| Yb doped | 500–3900 | 0.06–0.33 |
| $MgTiO_3$ | 14 | 0.0025 |
| $CaTiO_3$ | 153 | 0.0003 |
| $SrTiO_3$ | 240 | 0.00012 |
| PZT (8/90/10)[(1)]* | 303 | 0.004 |
| PMN89[(2)]* | 6700–9000 | 0.003 |

*Commercial material
[(1)]Lead-Zirconate-Titanate
[(2)]Lead Magnesium-Niobate

Ceramic capacitors manufactured by conventional procedures of blending powders and sintering them in pellet form contain numerous defects, typically in the form of porosity, which lowers their dielectric strength. Because of this, electrical strength of ~10 V/μm is typical, and thus ceramics are used only for low voltage stress applications.

Another method of fabricating ceramic capacitors is the fabrication of ceramic precursor "tape" which involves blending the ceramic powder with organic binders and other additives in a solvent system, and casting the resulting slurry onto a carrier film, such as Mylar®, in order to form a flexible 'green' tape after evaporation of the solvent, having a thickness controlled during the casting operation. These green tapes are metallized using a screen printing process wherein a thin layer of conductor metal, also in an organic carrier system, is applied to tape surface. Once the solvent has evaporated (and the tape is 'dry'), the tape is cut or punched into smaller pieces, the pieces stacked, and laminated together using heat and pressure to form a multi-layer capacitor. Finally, the multi-layer capacitor is sintered to remove the organic materials and densify the ceramic into a high density monolithic piece. This approach provides high capacitance in a small volume.

The deficiency of this approach is that the quality of the tape and the final ceramic suffers from non-uniformity in the sintering of the ceramic powder. Because of the irregular shape of all normally processed ceramic powder particles, the packing of the powder in the green tape is not totally uniform, and during the sintering operation, voids are formed which lead to defects in one or more of the layers of the capacitor, and the overall ceramic capacitor does not possess the properties that a fully dense, pore free material should have. In particular, the voltage stand-off is poor. This problem has not been solved by the capacitor manufacturers.

The solution to this problem is an object of the present application. Not only does the invention provide a fully dense, defect free capacitor, but the dielectric constant of the ceramic can be varied at will, and the design of the capacitor is not limited to a multi-layer design; it can be a wound design.

DESCRIPTION OF THE PRIOR ART

U.S. Pat. No. 4,835,656 discloses a multi-layered ceramic capacitor utilizing sintered ceramic thin plates, useful in miniature hybrid circuit modules. It makes reference to two prior art methods for the manufacture of the capacitor.

Briefly in the first method, alternate layers of ceramic material and conductive material are prepared which are then dried and fired forming a so called "sintered laminate capacitor". The second involves forming ceramic "green sheet" from dielectric material paste by a doctor blade technique. The sheets so formed are cut to size and dried. The conductive layer is formed by applying a conductive paste by a screen printing technique. The resulting product is dried, stacked together forming a multi-layer capacitor.

U.S. Pat. No. 5,140,498 describes a wound thin film capacitor. It is formed by the method of applying a solution of a metal-organic alkoxide composition to at least one flat surface of an electrically conductive metal strip and heating the coated strip so as to remove the organic component of the metal-organic alkoxide composition and produce a thin, electrically non-conductive metal oxide film on the flat surface. The metal strip with the metal oxide coating is then wound on a spool to form a wound thin film capacitor.

U.S. Pat. No. 5,234,556 describes polymeric metal oxide materials and their formation from metal alkoxide solutions and articles including such polymeric metal oxides especially in the form of thin films.

SUMMARY OF THE INVENTION

It is an object of this invention to provide a process for the fabrication of a highly dense defect free capacitor.

It is another object of the present invention to provide a process for the production of a highly dense defect free capacitor in which the dielectric constant of ceramic can be varied at will.

It is a further object of this invention to provide a process for the production of a fully dense capacitor not limited to a multi-layer design but also a wound design as described for example in the U.S. Pat. No. 5,140,498.

Briefly the method herein involves in the first step the preparation of ceramic powders utilizing the sol-gel technology yielding homogenous ceramic powder of uniform composition at the atomic level, having narrow size distribution and spherical in shape.

The powder thus produced is then used to prepare the ceramic substrate by the tape casting process.

DETAILED DESCRIPTION OF THE INVENTION

Figure 1:
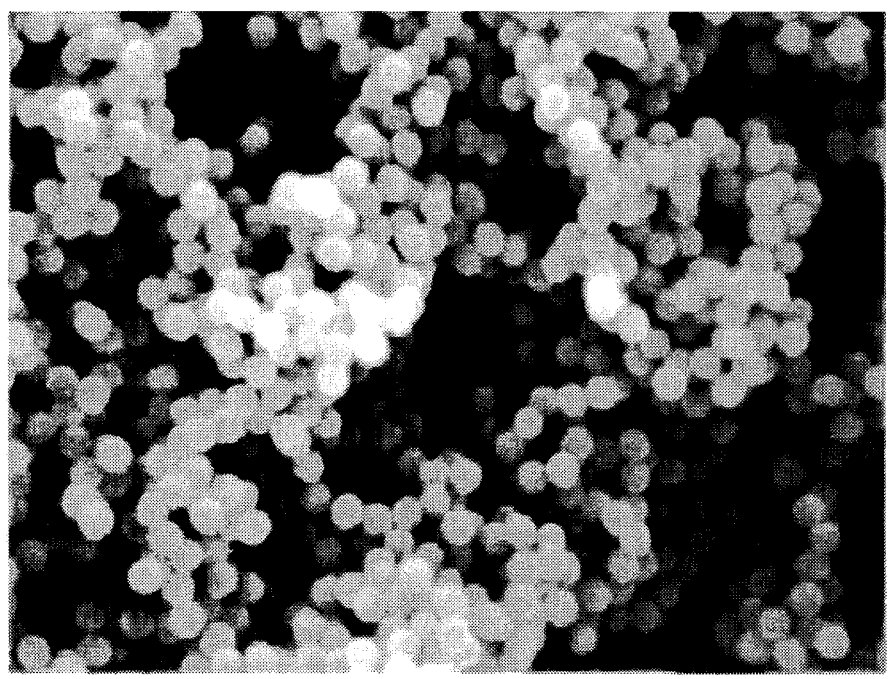
FIG. 1 is a photograph which illustrates the spherical powder of $TiO_2$ showing the excellent size uniformity obtained by the sol-gel process.

The present invention resides in the fabrication of microelectronic substrates, e.g. capacitors and the products thus obtained. This fabrication comprises in the first step the preparation of a homogenous ceramic powder of uniform composition at the atomic level. The second step involves tape casting the resulting ceramic powder into capacitors.

In the broadest sense, the use of sol-gel technology for making homogeneous ceramic powders e.g. mixed oxides such as barium titanate ($BaTiO_3$) of uniform composition at the atomic level, provides for a narrow size distribution and spherical shape of the resulting powder. Tape casting allows a facile way to prepare thin flat ceramic substrate. Without the combination of these technologies, ceramics cannot be fabricated with sufficiently high quality to prevent random defects such as voids or pores which would completely eliminate the possibility of wound capacitors, since long, defect-free lengths are necessary to wind a capacitor suitable for high power density.

Sol-gel technology further allows the atomic level mixing of different elements so that the required multi-element composition as set forth in Table 1, can be prepared in solution. The desired ceramic powder is prepared by precipitation and subsequent calcination at a low temperature. Thus, the process totally avoids the conventional procedures of mixing the individual ceramic powders, utilizing a high temperature sintering operation to react them to form the desired composition, and the subsequent milling procedure to reduce the size of the powder to a form suitable for tape casting. By this simple sol-gel procedure the impurities introduced by the conventional high temperature sintering and milling operations are completely avoided, thus allowing very low electrical losses in the powder. In addition, the sol-gel approach allows distillation of the precursor solutions (if necessary) to form a very pure starting material, which will further reduce the electrical losses. Other processes which include controlled hydrolysis and condensation of metal oxides may also be used.

Traditional methods for producing ceramic powder can be readily adapted for the present invention. For example, the selected component oxides as described in Table 1 are mixed mechanically in the appropriate stoichiometric amounts. The mixture is calcined at high temperature to obtain a single phase followed by milling. However, the product obtained from such traditional methods will not display the high voltage standoff obtained when spherical sol-gel derived powders are used. Among the oxides useful for the present invention there may be mentioned for example: lead magnesium niobate, lead zirconate titanate, lead iron tungstate, lead iron niobate, lead nickel niobate, titanium oxide, barium titanate, calcium titanate, magnesium titanate, strontium titanate, silica, or mixtures thereof. Such mixtures include for example $SiO_2$—$TiO_2$ and the like.

In the case of titanium dioxide powder, a typical process involves the following steps:

(a) preparing a solution of titanium alkoxide in solvent, said titanium alkoxide having the formula $Ti(OR)_4$ wherein R is alkyl containing 1 or more carbon atoms, said solvent comprising a member selected from the group consisting of aliphatic, cycloaliphatic and aromatic compounds containing 1 or more carbon atoms, (b) admixing water in an amount ranging from that stoichiometrically equivalent to one alkoxide group of each alkoxide molecule to that stoichiometrically equivalent to all the alkoxide groups of each alkoxide molecule and heating at a temperature ranging from 10° to 70° C. for a time period ranging from 0.5 to 48 hours to cause hydrolysis and condensation and diluting with said solvent if necessary, to yield a free-flowing sol and (c) drying and milling the sol to break up the agglomerated particles to create a powder having uniform, fine particle size.

An example of the excellent sphericity obtainable by sol-gel is shown in FIG. 1 for the case of $TiO_2$, which can readily be used in a capacitor. This type of powder morphology is absolutely essential to the fabrication of a material which will sinter to theoretical density without formation of random pores due to poor packing of the particles. As can be readily visualized, the packing of a monolayer of spheres to form a close packed hexagonal structure can be made very easily, as opposed to the packing of typical ceramic powders which are always irregular in shape, and possess a large size distribution: this is unavoidable using standard, conventional ceramic processing.

The next step involves tape casting to form the desired capacitor. This process involves preparing a slip of the selected powder with an organic binder then discharging the ceramic slip, which has a viscosity and consistency approximately the same as heavy cream, from a reservoir onto a supported, moving surface, preferably a plastic sheet or film such as cellulose acetate, polytetrafluoroethylene ("Teflon"), or glycol terephthalic acid ester ("Mylar"). The film is usually in the form of an elongated strip several hundred feet long and from ½ to 2 feet or more wide, wound on a storage reel mounted next to the reservoir.

The film is led from the storage reel under the reservoir to a takeup reel, and a suitable drive mechanism moves the film in a substantially horizontal path from the storage reel to the takeup reel. The cast slip is distributed evenly on the moving film by an inverted dam forming the outlet of the reservoir or by a doctor blade in order to form a layer of uniform and controlled thickness.

As the layer of cast slip is conveyed on the plastic film from the reservoir, the volatile solvents evaporate, the process of driving off the solvents being accelerated by passing the tape through an elongated, heated drying chamber. The resulting product is a ceramic tape that is aptly described as "leather hard". This tape can be punched or sliced into the shape and size desired for the substrate or other item and then be fired at high temperature (e.g. 1500° C.) to produce a rigid ceramic article.

To form a capacitor, the tape is metallized with an appropriate electrode (e.g., Ag, Au, Pd-Ag and the like) using a screen printer or other technique which produces a thin (0.2–1 mil thick) metal powder/organic binder layer. This metallization densifies and shrinks during the ceramic firing process to produce a continuous metal electrode exhibiting high electrical conductivity. A wound ceramic capacitor would be made by a printing process that produces a continuous metal electrode on the surface of the ceramic tape. The tape can also be metallized on both surfaces to create the capacitor element.

As described above, the spherical sol-gel derived material produces a high packing density in the tape, and during sintering the material densifies to theoretical density with very controllable and reproducible shrinkage. This is not so for tapes made using conventional powders: the sintered density will usually not be theoretical due to the incorporation of voids from the irregular shaped starting powder. Also, the shrinkage is not so reproducible due to the much larger size distribution and random particle packing.

In the microelectronic substrate industry, co-fired ceramic packages involve the metallization of ceramic tape prior to lamination and sintering. There are several types of metallization used, depending on the sintering temperature of the ceramic in the tape. For example, $Al_2O_3$ tape requires either a Mo-Mn or a W based metallization because of the relatively high densification temperature of this ceramic, whereas other types, known as low temperature co-fired ceramic (LTCC) tapes, use either a gold, silver or copper based metal. For the preparation of a capacitor, these same types of metallization can be used, again depending on the sintering requirements of the ceramic.

The green tape is highly flexible, and as described above typically uses a thermoplastic usually organic binder system. Such a tape can be made of a very controllable thickness, from less than a few mils (e.g., 0.0005 in. or so) to much thicker (25 mils or more) depending on the type of capacitor required. For multilayer capacitors, the pieces of tape (having metallization patterns and vias already screen printed) are laminated under a low pressure, usually at a small elevated temperature (e.g., 1000 psi at 70° C. would be a typical procedure) for a few minutes to 'weld' the layers together prior to sintering. After sintering, the original interfaces of the layers cannot be seen due to the bonding of the powder particles across the interface.

Our invention of making a coil (wound) capacitor utilizes essentially the same procedures. The length of green tape required to form the capacitor would be screen printed on one side (only one is necessary although both sides could be metallized), and the tape length coiled to form the wound structure. The metallization would depend on the sintering requirements for the particular capacitor material. Lamination would utilize the same procedures as for the multilayer substrates, and the green coil sintered to remove the organics and densify the tape. This would occur in the same manner as in the multilayer substrate manufacture. Shrinkage during sintering would occur, in the range of 15–30%, during the densification process, with the metallization shrinking the same amount so that the final coil would be integral. The capacitor design would have to account for the shrinkage, as is done in the conventional multilayer substrate and capacitor industry. The only difference is that the sol-gel approach to a coiled ceramic capacitor allows for a defect free product. The final metallization and lead attachment would be performed on the fired (sintered) capacitor, as is done in conventional manufacture.

The flexibility of the ceramic tape is excellent, and the winding of a small radius of curvature is entirely feasible using tape technology. Also, the length of the tape for winding is not limited, since in the ceramic processing industry, tapes are made on continuous casters in which the tape is cast at one end of the caster, and the dry tape coiled on a drum at the other.

What is claimed is:

1. A method of manufacturing a ceramic capacitor suitable for high energy density and high temperature application characterized by the fact of
   a. producing the appropriate oxide powders using the sol-gel process and mechanically mixing the powders,
   b. calcining the mixture to remove organics and obtain the desired phase,
   c. milling the resulting ceramic powder to deagglomerate the powder and obtain a desired particle size,
   d. forming a slip with said ceramic powder with a binder and a volatile solvent,
   e. casting the slip on a moving surface to form a thin tape,
   f. drying said tape to form a flexible ceramic tape,
   g. screen printing a conductor thereon and pre-forming the desired capacitor structure, and
   h. firing the structure to produce the desired sintered capacitor form.

2. A method according to claim 1 in which in Step (a) the oxide is prepared by co-precipitating the pre-determined chemical composition for this capacitor by first pre-mixing the appropriate precursor solutions followed by a sol-gel precipitation yielding individual particles containing the required cation concentrations.

3. A method according to claim 1 wherein said oxide is lead magnesium niobate, lead zirconate titanate, lead iron tungstate, lead iron niobate, lead nickel niobate, titanium oxide, barium titanate, calcium titanate, magnesium titanate, strontium titanate, silica, or mixtures thereof.

4. A method according to claim 2 wherein said oxide is lead magnesium niobate, lead zirconate titanate, lead iron tungstate, lead iron niobate, lead nickel niobate, titanium oxide, barium titanate, calcium titanate, magnesium titanate, strontium titanate, silica, or mixtures thereof.

5. A method according to claim 1 in which said conductor comprises copper, gold, silver or palladium-silver.

6. A method according to claim 1 in which the sol-gel process in step (a) yields substantially discrete particles having a spherical shape.

7. A method according to claim 2 in which the sol-gel process in step (a) yields substantially discrete particles having a spherical shape.

8. A method of manufacturing a ceramic capacitor, said method comprising the steps of:
   precipitating oxide powders using a sol-gel process;
   using said oxide powders to form a ceramic tape;
   applying conductors to the ceramic tape and pre-forming a desired capacitor structure; and
   firing the structure to produce a sintered film capacitor.

9. A method according to claim 8 in which the oxide powder is prepared by co-precipitating a predetermined chemical composition by premixing precursor solutions followed by a sol-gel precipitation yielding individual particles containing predetermined cation concentrations.

10. A method according to claim 9 wherein the oxide is lead magnesium niobate, lead zirconate titanate, lead iron tungsten lead iron niobate, lead nickel niobate, titanium oxide, barium titanate, calcium titanate, magnesium titanate, strontium titanate, silica, or mixtures thereof.

11. A method according to claim 9, wherein the sol-gel process yields discrete particles having a spherical shape.

12. A method according to claim 8 wherein the oxide is lead magnesium niobate, lead zirconate titanate, lead iron tungsten lead iron niobate, lead nickel niobate, titanium oxide, barium titanate, calcium titanate, magnesium titanate, strontium titanate, silica, or mixtures thereof.

13. A method according to claim 8, wherein the conductor comprises copper, gold, silver or palladium-silver.

14. A method according to claim 8, wherein the sol-gel process yields discrete particles having a spherical shape.

* * * * *